United States Patent [19]

Perego

[11] Patent Number: 5,121,886
[45] Date of Patent: Jun. 16, 1992

[54] PROCESS AND APPARATUS FOR FINDING ONE END OF TAPE WOUND ONTO A REEL

[75] Inventor: Luciano Perego, Milan, Italy

[73] Assignee: Tapematic U.S.A., Inc., Orlando, Fla.

[21] Appl. No.: 585,595

[22] Filed: Sep. 20, 1990

[30] Foreign Application Priority Data

Aug. 6, 1990 [IT] Italy ................ 21226 A/90

[51] Int. Cl.⁵ ............ G11B 15/67; B65H 19/22
[52] U.S. Cl. .................. 242/57; 242/195; 242/78.8; 242/58.4; 226/92
[58] Field of Search ........... 242/57, 188, 195, 78.8, 242/58.4; 360/74.6, 74.5; 226/91, 92

[56] References Cited

U.S. PATENT DOCUMENTS

| | | | |
|---|---|---|---|
| 4,091,426 | 5/1978 | Umeda | 242/188 |
| 4,543,152 | 9/1985 | Nozaka | 242/57 |
| 4,657,198 | 4/1987 | Shimizu et al. | 242/57 |
| 4,721,263 | 1/1988 | Miyazaki | 242/78.8 |
| 4,913,366 | 4/1990 | Andou | 242/57 |

Primary Examiner—Daniel P. Stodola
Assistant Examiner—John Q. Nguyen
Attorney, Agent, or Firm—Edgar H. Haug; Adam L. Brookman

[57] ABSTRACT

In an automatic cassette loading machine a pancake is mounted on a rotatable support hub. A reading member comprising a photoelectric cell and carried by a main carriage movable at right angles to the axis of the pancake is disposed at a position spaced apart from the pancake itself and is then moved close to the latter. When the peripheral edge of the pancake is intercepted by the light beam emitted by the photoelectric cell the reading member is moved away from the pancake and disposed so that it can intercept the passage of a closure tab fastening the end of the tape on the pancake. The pancake rotation is then stopped when the location of the closure tab enables it to be picked up by a grasping member associated with the cassette loading machine.

8 Claims, 4 Drawing Sheets

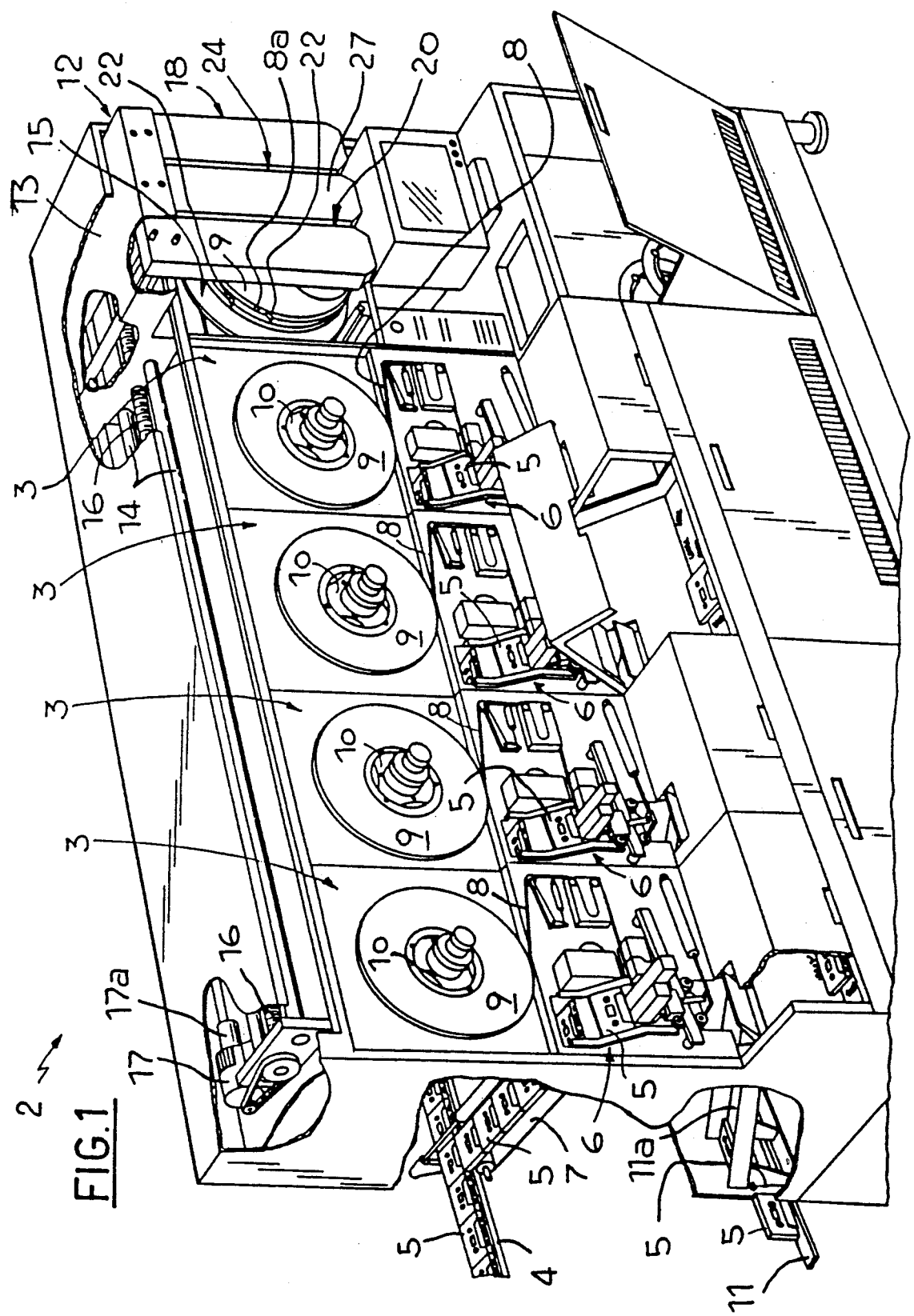

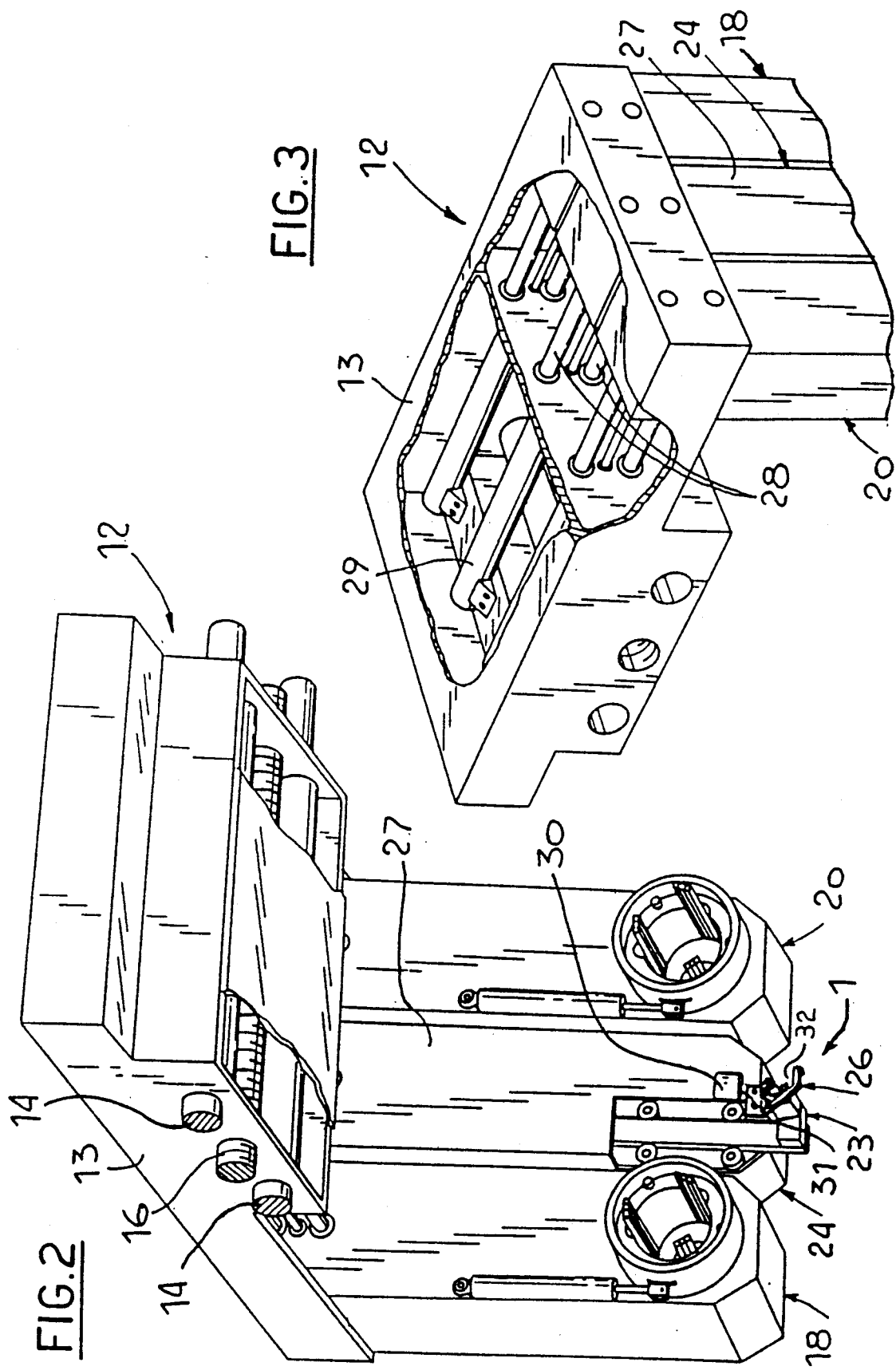

PROCESS AND APPARATUS FOR FINDING ONE END OF TAPE WOUND ONTO A REEL

BACKGROUND OF THE INVENTION

The present invention relates generally to automatic tape loading machines and more particularly to a method and apparatus for finding one end of tape wound onto a reel the tape end being fastened to the reel by a closure tab exhibiting a free portion oriented outwardly to the reel itself.

PRIOR ART

Typically, the loading of tape cassettes is carried out in appropriate automatically operated loading machine. In these machines the cassettes to be loaded are automatically engaged, one at a time, in a loading station in which a magnetic tape continuously coming from a supply reel of tape or "pancake" mounted on a rotatable support hub, is wound in a predetermined amount into a cassette.

Generally, these loading machines are automated so that manual intervention in operation is substantially limited to the supply of empty cassettes into magazines associated with the machines as well as the periodic replacement of empty pancakes.

In spite of this degree of automation the execution of these manual operations gives rise to serious problems, since it is increasingly important to entrust a single operator with the task of managing several loading machines.

Frequently, in order to replace an empty pancake, the operator, after removing the empty pancake and mounting the new one on the tape loading machine, must manually pick up the tape end of the new pancake and guide it, in a predetermined path, between the different members of the loading machine before reaching the cassette to be loaded. The time necessary for carrying out this operation greatly reduces the ability to entrust a single operator with the management of several loading machines.

It would be clearly be beneficial if tape loading machines were able to automatically pick up the tape end from the new pancake mounted on the hub and thread the tape between the different loading machine members to the cassette at the loading station.

The same Applicant has devised an apparatus capable of performing the above functions which is the object of an Patent Applications filed on the same date in the name of the same Applicant including United States Patent Application Serial No. 07/585,809 entitled Tape Threading Apparatus which is incorporated herein by reference.

The same Applicant has also developed a tape loading center equipped with different loading modules each having a loading station where cassettes are loaded with tape coming from pancakes. In this loading center the replacement of empty tape pancakes in the different modules is carried out automatically by a manipulating unit. The loading machine as well as the manipulating unit associated therewith are the subject matter of respective Patent Applications filed on the same date in the name of the same Applicant including U.S. applications Ser. Nos. 07/585,395 and 07/585,710 entitled Tape Loading Center and Apparatus for Supplying Tape Machines with Reels of Tape respectively, which are incorporated herein by reference.

The apparatus for picking up the tape from the pancake can perform its functions only if the pancake, after being mounted on the hub, is disposed in such a manner that the end of the tape wound thereon is located at a point from which it can be easily picked up by a grasping element associated with the apparatus. Since the pancake is mounted on the hub in a completely random manner, the apparatus for picking up the tape must be assisted by means capable of finding the tape end on the circumference of the pancake.

SUMMARY OF THE INVENTION

The main object of the present invention is therefore to provide a process and an apparatus adapted to completely meet the above requirements.

The foregoing and further objects which will become more apparent in the course of the present description are substantially attained by a process for finding the end of a magnetic tape wound onto a pancake in automatic cassette loading machines, comprising the steps of mounting the pancake on a support hub, positioning a reading member at a position spaced apart from the pancake, moving the reading member close to the pancake, in a direction at right angles to the axis of the pancake itself, to the peripheral edge of the pancake, moving the reading member a predetermined distance from the pancake, rotating pancake, stopping the pancake rotation as soon as the reading member intercepts the closure tab.

The above process is put into practice by an apparatus for finding the end of a magnetic tape wound onto a pancake which comprises: a main carriage movable at right angles to the pancake axis, a reading member operatively supported by the main carriage and adapted to be moved, as a result of the movement of the carriage itself, close to and away from the pancake so that it may intercept the closure tab and stop the pancake rotation when the closure tab is in a predetermined position.

BRIEF DESCRIPTION OF THE DRAWINGS

In the drawings:

FIG. 1 is a partial cutaway, perspective fragmentary view of a tape loading center, to which the apparatus of the present invention has been mounted;

FIG. 2 is a partial cutaway perspective fragmentary view of the apparatus of the present invention mounted on a manipulating unit;

FIG. 3 is a partial cutaway perspective fragmentary view of the manipulating unit seen from the side opposite that shown in FIG. 2;

DESCRIPTION OF THE PREFERRED EMBODIMENT

Figure 4:
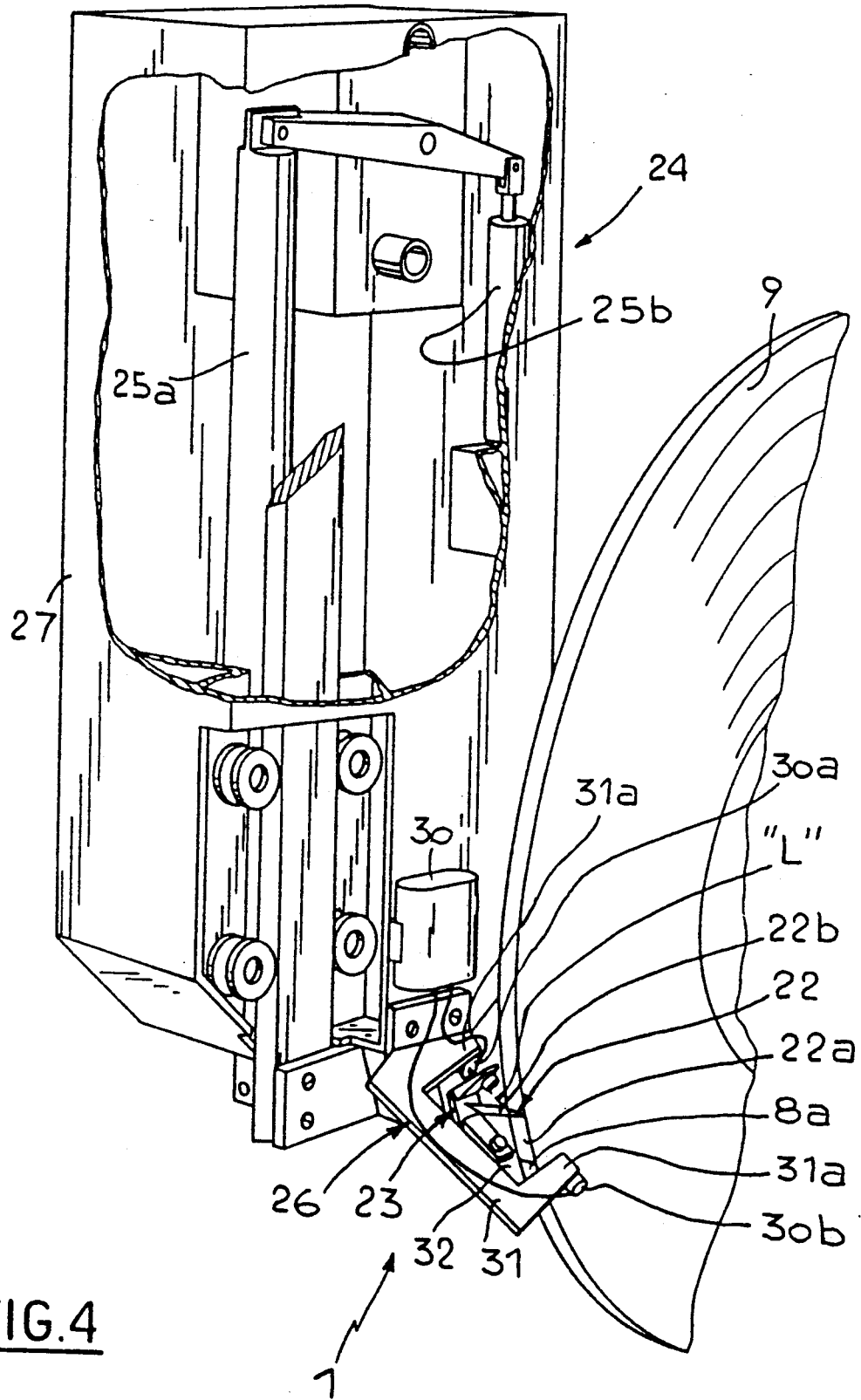
FIG. 4 is a detailed partial cutaway perspective view of the manipulating unit emphasizing the structure of the apparatus of the invention.

Referring FIGS. 2 and 4, an apparatus for finding the end of a magnetic tape wound onto a pancake made in accordance with the present invention has been generally identified by reference numeral 1.

In the embodiment shown, apparatus 1 is associated with a tape loading center generally referenced by 2 in FIG. 1. Only the essential parts of the machine will be briefly described herein as the machine has been disclosed in detail in the Patent Application entitled Tape Loading Center previously incorporated by reference.

The machine 2 has a number of loading modules 3 disposed in side by side relation and in mutual alignment, to which a plurality of cassettes 5 are sent by a supply conveyor 4. Each loading module 3 has a loading station 6 in which the cassettes 5 come from an infeed conveyor 7 which is fed by a supply conveyor 4. The cassettes 5 are engaged one at a time in order to be loaded with the magnetic tape 8 which is fed from a pancake 9 rotatably mounted on a support hub 10. When the loading has been completed the cassette 5 is released from the loading station 6 and removed from the machine 2 through a discharge chute 11a which terminates in a discharge conveyor 11.

When one of the pancakes 9 is out of tape 8, a manipulating unit, generally identified by 12, is operated through sensor means to remove the empty pancake and replace it with a new pancake. New pancakes are taken from a supply magazine 15 which supports a plurality of tape loaded pancakes 9.

The manipulating unit 12 comprises a main carriage 13 horizontally movable along guide bars 14, in a direction at right angles to the axis of the pancakes 9 mounted on the hubs 10. The movements of the main carriage 13 is driven by a worm screw 16 which, is in turn, driven by a motor 17 controlled by an encoder 17a. The manipulating unit 12 is also provided with a pick-up module 18 designed to pick up the individual pancakes 9 from the supply magazine 15.

Once it has picked up a pancake 9 from the magazine 15, the manipulating unit 12 is moved along the guide bars 14 so that it comes into register with the loading module 3 in which the pancake 9 needs to be replaced. At this point, a discharge module 20, disposed in side-by-side relation relative to the pick-up module 18, automatically removes the out of tape pancake 9 from the support hub 10. Then the manipulating unit 12 is again moved forward along the guide bars 14 for a short distance, so the said pick-up module 18 is brought in front of the hub 10 to fit the new pancake 9 on the hub 10.

The structure and operation of the loading 18 and discharge 20 modules, the supply magazine 19 and the hub 10 are not further described as they are discussed in detail in the Patent Application entitled Apparatus for Supplying Tape Loading Machines With Reels of Tape, previously incorporated by reference.

As clearly viewed from FIG. 1, each pancake 9 located in the supply magazine 15 has one end 8a of the respective tape 8 secured to the pancake itself by means of a closure tab 22. In greater detail, and as more clearly shown in FIG. 4, this closure tab 22 has an adhesive portion 22a by which the fastening of the end 8a to the pancake is carried out, as well as a free portion 22b oriented outwardly from the pancake.

When the pancake 9 has been engaged on a particular support hub 10, the closure tab 22 is randomly located at any point on the circumference of the pancake itself. In accordance with the present invention, it is preferable that the closure tab 22 be disposed in a predetermined position so that its free portion 22b may be easily picked up by a grasping member 23 associated with a setup module 24 (part of the manipulating unit 12). The grasping member 23, (not described in detail herein as it is discussed in detail in the Patent Application entitled Tape Threading Apparatus previously incorporated herein by reference), is movable in a vertical direction upon command of one or more fluid-operated cylinders 25a, 25b so that it causes the held end 8a of the tape 8 to travel according to a predetermined path between different members of the corresponding loading module 3. This movement occurs simultaneously with the displacement of the main carriage 13 along the guide bars 14.

In order to orient the closure tab 22 in a position adapted for pick up by the grasping element 23, a reading member 26 is provided. The reading member 26 is fastened at its lower part to a support arm 27 which is part of the setup module 24. The support arm 27 extends vertically downwardly from the main carriage 13. The support arm 27 is connected to the main carriage 13 by a pair of guide bars 28 which allow the arm 27 to move parallelly to the axes of the pancakes 9 upon command of a fluid-operated actuator 29 (see FIG. 3). As a result of this movement, the reading member 26 is shifted from a rest position, in which it is axially spaced apart from the pancakes 9 so that it does not interfere with the support hubs 10 when the main carriage 13 is moved, to an operating position in which it substantially operates in the same lying plane as the pancake 9 mounted to support hub 10.

Preferably, the reading member 26 comprises a photoelectric cell 30 provided with a photoemitter 30a designed to emit a light beam shown in dotted lines and referenced by "L". The photoemitter 30a is suitably inclined, relative to the axis of the pancake 9 to emit the light beam "L" which will be broken by a closure tab end 22b. A photoreceiver 30b, faces the photoemitter 30a so as to receive the light beam "L" emitted by the latter. The angle of inclination of the light beam "L" relative to the axis of the pancake 9 preferably has a value in the range of 30° to 60° and it is ideally equal to 45° in one preferred embodiment of the present invention.

As can be seen from FIG. 4, the photoemitter 30a and photoreceiver 30b are located at the opposite ends 31a of a forkshaped element 31 which between its ends defines a housing 32 adapted to be engaged by the outer peripheral edge of the pancake 9.

Preferably, the grasping member 23 is also accommodated in the housing 32 when it is at rest.

Figure 5:
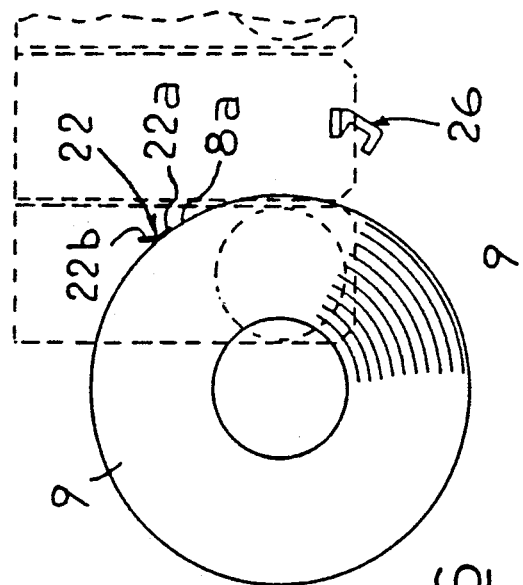
FIGS. 5 through 8 are diagrammatic front views of the steps of the process for finding the end of a tape wound onto a pancake.

When the new pancake 9, carrying the use tape 8, is mounted on a support hub 10 by means of the pick-up module 18, the support arm 27 is moved away from the pancake 9, so that the reading member 26 is in its rest position. In this situation, the relative positioning between the reading member 26 and the pancake 9 is as shown in FIG. 5.

Figure 6:
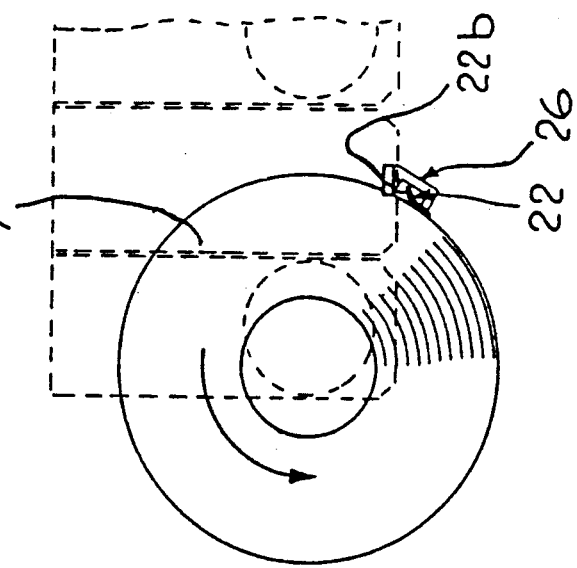
Figure 7:
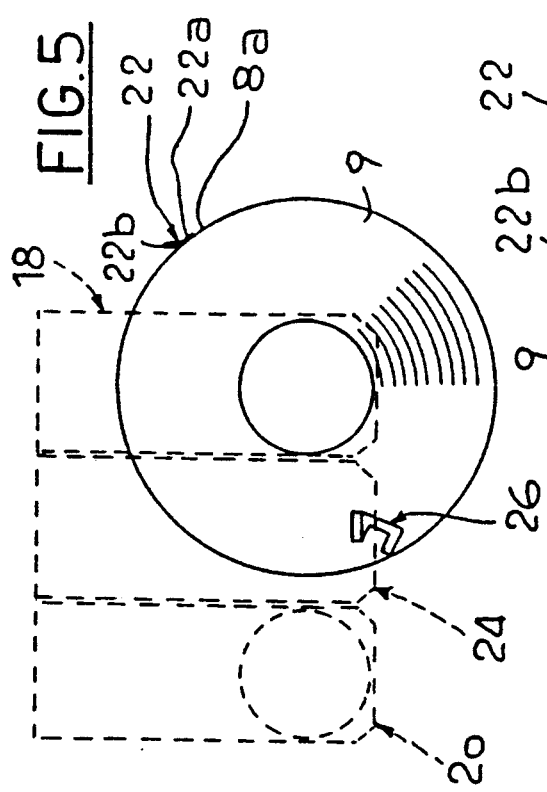
Figure 8:
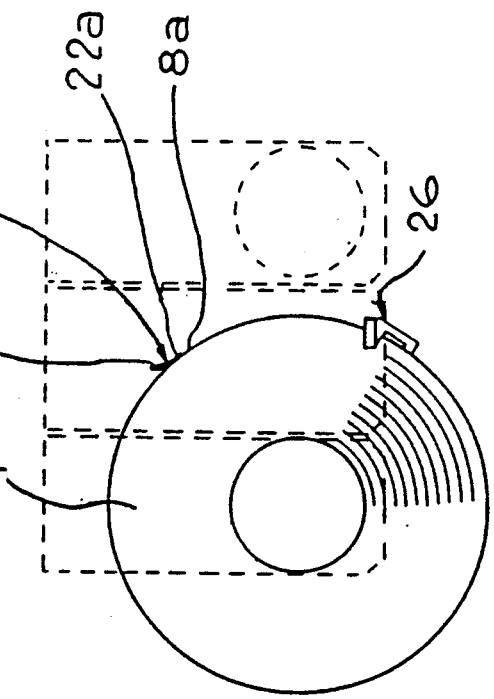

Once the engagement of the pancake 9 has occurred, the main carriage 13 is moved along the guide bars 14 under the control of encoder 13a so that the reading member 26 takes a position spaced apart from the pancake 9, as shown in FIG. 6. The distance between the reading member 26 and the axis of the pancake is higher than the value of the maximum radius of the pancakes 9 used in the loading machine 2.

At this point, the support arm 27, upon command of the actuator 29, is axially moved closer to the pancake 9 in order to bring the reading member 26 to its working position.

In order to locate the peripheral edge of the pancake 9, the main carriage 13 is moved along the guide bars 14 so that the reading member 26 is moved close to the pancake 9 at right angles to the axis of the pancake itself. Within a more or less short period of time, depending upon the diameter of the pancake 9, the peripheral edge of the pancake 9 will be introduced into the housing 32 defined between the ends 31a of the forked-shaped element 31. As a result, the photoelectric cell 30 will detect the breaking of the light beam "L" emitted by the photoemitter 30 and will command reverse movement of the carriage 13.

In greater detail, the carriage 13 is moved so that the reading member 26 is again moved away from the pancake 9 by a predetermined amount. This distance must be sufficient to enable the light beam "L" to be intercepted by the free portion 22b of the closure tab 22 when the latter passes between the photoemitter 30a and the photoreceiver 30b as rotation is imparted to the pancake 9 by the hub 10. As soon as the light beam "L" is intercepted by the closure tab 22, the photoelectric cell 30 will stop the rotation of the pancake 9 such that the free end 22b will be disposed in a predetermined position enabling it to be picked up by the grasping member 23.

In a preferred embodiment of the present invention, the starting of rotation of the pancake 9 occurs simultaneously with the positioning of the reading member 26 to its working position. (This is before the beginning of the step in which the reading member is moved close to the pancake for detecting the pancake's peripheral edge.) In this case, the second displacement of the reading member 26 away from the pancake 9 occurs after the pancake 9 has been rotated about its own axis, starting from the moment at which the interception of the light beam "L" takes place.

In this embodiment, possible uncertainties related to the operation of the apparatus are avoided. Such uncertainties could occur if the closure tab 22 were positioned, when the pancake 9 is stationary, so as to intercept the light beam "L" during the approaching step of the reading member 26 for finding the outer diameter of the pancake 9. In fact, in this situation, the photoelectric cell 30 would cause the reading member 26 to be moved away from the pancake and its wrong positioning would prevent it from properly carrying out the search for the closure tab 22.

The process and apparatus of the present invention make it possible to find the end of tape wound onto a supply reel in a quick and precise manner so as to enable the end of the tape to be engaged by an automatic device adapted to make the tape ready for a cassette loading machine.

The process and apparatus of the present invention operate to reliably locate the end of tape on a reel regardless of the outside diameter of the pancakes used.

Although the present invention has been described with reference to a specific embodiment, neither the exact described operation, or the specific structure mentioned should be construed as limiting since the disclosed embodiment is merely illustrative of the invention. One of skill in the art may alter the described embodiment without departing from the spirit or scope of the invention.

What is claimed is:

1. A method to locate an end of magnetic tape wound onto a reel comprising the following steps:
    mounting the reel on a support hub;
    positioning a reading member at a location spaced apart from the reel;
    automatically moving the reading member close to the reel until the peripheral edge of the reel is automatically detected by the reading member;
    automatically moving the reading member a predetermined distance away from the peripheral edge of the reel;
    rotating the reel;
    automatically detecting a projecting end, associated with the end of the tape, extending outwardly from the reel; and
    automatically stopping the reel rotation when the reading member detects said projecting end.

2. A method to locate one end of a magnetic tape wound onto a reel comprising the following steps:
    mounting the reel on a support hub;
    positioning a reading member at a location spaced apart from the reel;
    driving the reel in rotation;
    automatically moving said reading member close to the reel until the peripheral edge of the reel is automatically detected by said reading member;
    automatically moving said reading member a predetermined amount away from the peripheral edge of the reel; and
    automatically stopping the reel rotation as soon as said reading member detects a projecting end, extending outwardly from said peripheral edge of the reel, such that said projecting end is disposed in a predetermined position.

3. An apparatus for finding one end of a magnetic tape wound on a reel comprising:
    a rotatable support hub adapted to operatively engage the reel;
    a main carriage movable relative to the reel axis; and
    a reading member operatively supported by said main carriage and adapted to be moved, as a result of the movement of the carriage itself, close to the reel to detect the peripheral edge of the reel, and away from the reel a predetermined distance to detect a projecting end, associated with the end of the tape, extending outwardly from the reel, and to send a signal to stop the rotation of the reel when the projecting end is in a predetermined position.

4. The apparatus as claimed in claim 3, wherein said reading member comprises a photoelectric cell provided with a photoemitter and a photoreceiver fastened to the opposite ends of a fork-shaped element defining an engagement housing between said ends which is adapted to accommodate the peripheral edge of the reel.

5. The apparatus as claimed in claim 4, wherein said photoemitter emits a light beam inclined to the axis of the reel.

6. The apparatus as claimed in claim 5, wherein the angle of inclination of the light beam relative to the reel axis is in the range of 30° to 60°.

7. The apparatus as claimed in claim 3, wherein said reading member is fastened to a support arm extending downwardly from the main carriage and movable parallely to the axis of said reel so as to bring the reading member from a rest position in which it is axially spaced apart from the reel to a working position in which it operates in substantially the same plane as the reel.

8. The apparatus as claimed in claim 7, wherein said support arm is associated with a grasping member designed to pick up the projecting end disposed in said predetermined position, said grasping member being movable at right angles to the movement direction of the main carriage so as to thread the magnetic tape between different members of a cassette loading machine, simultaneously with the movements carried out by the main carriage.

* * * * *